United States Patent
Panuganty

(10) Patent No.: US 11,868,411 B1
(45) Date of Patent: Jan. 9, 2024

(54) TECHNIQUES FOR COMPILING AND PRESENTING QUERY RESULTS

(71) Applicant: SPLUNK INC., San Francisco, CA (US)

(72) Inventor: Ramesh Panuganty, Cupertino, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 17/468,428

(22) Filed: Sep. 7, 2021

Related U.S. Application Data

(63) Continuation of application No. 15/663,596, filed on Jul. 28, 2017, now Pat. No. 11,113,342, which is a continuation of application No. 15/188,769, filed on Jun. 21, 2016, now Pat. No. 10,866,994.

(60) Provisional application No. 62/183,194, filed on Jun. 23, 2015.

(51) Int. Cl.
*G06F 16/951* (2019.01)

(52) U.S. Cl.
CPC .................................. *G06F 16/951* (2019.01)

(58) Field of Classification Search
CPC .................................................... G06F 16/951
See application file for complete search history.

(56) References Cited

U.S. PATENT DOCUMENTS

| | | |
|---|---|---|
| 6,292,796 B1 | 9/2001 | Drucker et al. |
| 6,766,320 B1 | 7/2004 | Wang et al. |
| 7,181,438 B1 | 2/2007 | Szabo |
| 7,305,380 B1 | 12/2007 | Hoelzle et al. |
| 7,403,938 B2 | 7/2008 | Harrison et al. |
| 7,519,585 B2 | 4/2009 | Kenney et al. |
| 7,937,344 B2 | 5/2011 | Baum et al. |
| 8,027,964 B2 | 9/2011 | Boulis |
| 8,112,425 B2 | 2/2012 | Baum et al. |
| 8,204,897 B1 | 6/2012 | Djabarov et al. |

(Continued)

OTHER PUBLICATIONS

Splunk Enterprise 8.0.0 Overview, available online, retrieved on May 20, 2020 from docs.splunk.com, 17 pages.

(Continued)

*Primary Examiner* — Robert W Beausoliel, Jr.
*Assistant Examiner* — Susan F Rayyan
(74) *Attorney, Agent, or Firm* — Artegis Law Group, LLP

(57) ABSTRACT

Improved crawling and curation of data and metadata from diverse data sources is described. In some embodiments, improvements are achieved by interpreting the context, vocabulary and relationships of data element, to enable relational data search capability for users. The user querying process is improved by systematic identification of the data objects, context, and relationships across data objects and elements, aggregation methods and operators on the data objects and data elements as identified in the curation process. User query suggestions and recommendations can be adjusted based on the context, relationships between the data elements, user profile, and the data sources. When the user query is executed, the query text is translated into an equivalent of one or more query statements, such as SQL or PostGre statements, and the query is performed on the identified data sources. Results are assembled to present the answer in a meaningful visualization for the user query.

17 Claims, 6 Drawing Sheets

(56) References Cited

U.S. PATENT DOCUMENTS

| | | | |
|---|---|---|---|
| 8,239,364 B2 | 8/2012 | Wable et al. | |
| 8,370,352 B2 | 2/2013 | Lita et al. | |
| 8,572,076 B2 | 10/2013 | Xiao et al. | |
| 8,751,529 B2 | 6/2014 | Zhang et al. | |
| 8,775,517 B1 | 7/2014 | Goldman et al. | |
| 8,788,525 B2 | 7/2014 | Neels et al. | |
| 8,972,332 B2 | 3/2015 | Ruhl et al. | |
| 9,110,992 B2 | 8/2015 | Johnson et al. | |
| 9,215,240 B2 | 12/2015 | Merza et al. | |
| 9,286,413 B1 | 3/2016 | Coates et al. | |
| 9,336,269 B1 | 5/2016 | Smith et al. | |
| 9,619,582 B1* | 4/2017 | Djabarov | G06F 16/951 |
| 9,881,102 B2 | 1/2018 | Gordner et al. | |
| 10,127,258 B2 | 11/2018 | Lamas et al. | |
| 10,339,144 B1 | 7/2019 | Upstill et al. | |
| 10,339,186 B2 | 7/2019 | Chakra et al. | |
| 10,346,414 B2 | 7/2019 | Ye | |
| 10,459,926 B2 | 10/2019 | Curtiss et al. | |
| 10,474,685 B1 | 11/2019 | Gomes et al. | |
| 10,592,093 B2 | 3/2020 | Sainani et al. | |
| 2003/0212675 A1* | 11/2003 | Denesuk | G06F 16/951 |
| | | | 707/999.005 |
| 2005/0039589 A1 | 2/2005 | Mori et al. | |
| 2007/0156696 A1 | 7/2007 | Lim | |
| 2007/0226203 A1* | 9/2007 | Adya | G06F 16/2445 |
| 2008/0059474 A1 | 3/2008 | Lim | |
| 2008/0215552 A1 | 9/2008 | Safoutin | |
| 2008/0249786 A1 | 10/2008 | Oldham et al. | |
| 2008/0256069 A1 | 10/2008 | Eder | |
| 2009/0216563 A1 | 8/2009 | Sandoval et al. | |
| 2009/0240683 A1 | 9/2009 | Lazier et al. | |
| 2009/0276419 A1 | 11/2009 | Jones et al. | |
| 2009/0313237 A1 | 12/2009 | Agrawal et al. | |
| 2010/0005087 A1 | 1/2010 | Basco et al. | |
| 2010/0070448 A1* | 3/2010 | Omoigui | H01L 27/1463 |
| | | | 706/55 |
| 2011/0119100 A1 | 5/2011 | Ruhl et al. | |
| 2012/0102002 A1 | 4/2012 | Sathyanarayana et al. | |
| 2012/0221555 A1* | 8/2012 | Byrne | G06F 16/951 |
| | | | 707/723 |
| 2012/0265744 A1 | 10/2012 | Berkowitz et al. | |
| 2013/0232167 A1 | 9/2013 | Vidra | |
| 2014/0025703 A1 | 1/2014 | Samuels et al. | |
| 2014/0040301 A1 | 2/2014 | Chadha et al. | |
| 2014/0188862 A1 | 7/2014 | Campbell et al. | |
| 2014/0282136 A1 | 9/2014 | Marantz et al. | |
| 2014/0358913 A1* | 12/2014 | Cai | G06F 16/90348 |
| | | | 707/728 |
| 2015/0095132 A1 | 4/2015 | Van et al. | |
| 2015/0220836 A1 | 8/2015 | Wilson et al. | |
| 2015/0286708 A1 | 10/2015 | Tao | |
| 2015/0317316 A1 | 11/2015 | Ghanekar et al. | |
| 2015/0317317 A1* | 11/2015 | Deng | G06F 16/24578 |
| | | | 707/748 |
| 2015/0363476 A1* | 12/2015 | Li | G06F 16/36 |
| | | | 707/736 |
| 2016/0026629 A1 | 1/2016 | Clifford et al. | |
| 2016/0034565 A1* | 2/2016 | Bastide | H04L 67/02 |
| | | | 707/749 |
| 2016/0125751 A1* | 5/2016 | Barker | G06N 20/00 |
| | | | 434/322 |
| 2016/0188702 A1 | 6/2016 | Lee-Goldman et al. | |
| 2016/0203138 A1 | 7/2016 | Feldschuh | |
| 2016/0378867 A1 | 12/2016 | Panuganty | |
| 2017/0010931 A1 | 1/2017 | Agarwal et al. | |
| 2017/0070521 A1 | 3/2017 | Bailey et al. | |
| 2017/0098002 A1 | 4/2017 | Byrnes et al. | |
| 2018/0150486 A1 | 5/2018 | Hawkes et al. | |
| 2019/0050406 A1 | 2/2019 | Nguyen et al. | |
| 2019/0098106 A1 | 3/2019 | Mungel et al. | |

OTHER PUBLICATIONS

Splunk Cloud 8.0.2004 User Manual, available online, retrieved on May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved on May 20, 2020, 6 pages.

Carraso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

TECHNIQUES FOR COMPILING AND PRESENTING QUERY RESULTS

CROSS-REFERENCE TO RELATED APPLICATIONS

This application is a continuation of the co-pending U.S. patent application title, "TECHNIQUES FOR COMPILING AND PRESENTING QUERY RESULTS," filed on Jul. 28, 2017, and having Ser. No. 15/663,596, which is a continuation of U.S. patent application titled, "SYSTEMS AND METHODS FOR INSTANT CRAWLING, CURATION OF DATA SOURCES, AND ENABLING AD-HOC SEARCH," filed on Jun. 21, 2016 and having Ser. No. 15/188,769, issued as U.S. Pat. No. 10,866,994, which claims priority benefit of the United States Provisional Patent Application titled, "SYSTEM AND METHODS FOR INSTANT CRAWLING, AND CURATION OF DATA SOURCES, AND ENABLING AD-HOC SEARCH TO QUERY DATA," filed on Jun. 23, 2015 and having Application No. 62/183,194. The subject matter of these related applications is hereby incorporated herein by reference.

BACKGROUND

Various users, such as commercial business users, use several disparate data sources to maintain and process data. One type of data source is a relational data source. Relational data sources are organized and accessed according to the relationships between data items. Relationships between data items are generally expressed as tables having rows and columns, which may be interconnected. Other forms of data sources, unlike the relational data sources, can include Excel documents, XML files, JSON format, word documents, and other text content as well.

SaaS applications like Salesforce, NetSuite, ServiceNow also offer structured data to the users for access using web services, APIs, REST interfaces and other programmable interfaces.

Data sources like Hadoop also offer structured as well as unstructured data and offer query interfaces that are both non-SQL and SQL based apart from other interfaces.

The query language (like "SQL", or "PostGre", or other programmable interfaces like APIs) is used to create, modify, and retrieve data from relational database management systems. Using a query language, a skilled user can retrieve data from a database and perform other, more complex functions. Although SQL or PostGre are standard query languages, many database products support these query languages with proprietary extensions to the language format.

The query language commands can be used to interactively work with a database or can be utilized programmatically to interface with a database. The non-relational documents are mostly searched as text content. Query language APIs have been very complicated and difficult to use. Moreover, these APIs have not provided functionality for easily allowing a keyword-based search to be performed on a database, such as those that are so common today in application programs and on Web pages. The complexity and limitations of previous query language APIs can be extremely frustrating for a developer trying to create a Web page or application program that executes even a simple keyword-based search query against a backend relational database.

The data fetched from multiple data sources is also difficult to integrate. Aggregating data from these sources in order to provide meaningful insights is always a cumbersome and time-consuming process. Cross referencing objects across multiple data sources, is typically not possible during the query itself and happens as a manual effort.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Improved crawling and curation of data and metadata from diverse data sources is described. In some embodiments, improvements are achieved by interpreting the context, vocabulary and relationships of data element, to enable relational data search capability for users. The user querying process is improved by systematic identification of the data objects, context, and relationships across data objects and elements, aggregation methods and operators on the data objects and data elements as identified in the curation process. User query suggestions and recommendations can be adjusted based on the context, relationships between the data elements, user profile, and the data sources. When the user query is executed, the query text is translated into an equivalent of one or more query statements, such as SQL or PostGre statements, and the query is performed on the identified data sources. Results are assembled to present the answer in a meaningful visualization for the user query.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Improved crawling and curation of data and metadata from diverse data sources is described. In some embodiments, improvements are achieved by interpreting the context, vocabulary and relationships of data element, to enable relational data search capability for users. The user querying process is improved by systematic identification of the data objects, context, and relationships across data objects and elements, aggregation methods and operators on the data objects and data elements as identified in the curation process. User query suggestions and recommendations can be adjusted based on the context, relationships between the data elements, user profile, and the data sources. When the user query is executed, the query text is translated into an equivalent of one or more query statements, such as SQL or PostGre statements, and the query is performed on the identified data sources. Results are assembled to present the answer in a meaningful visualization for the user query.

Thus, various embodiments are directed to determining the real world context of data in order to identify how users would query the data. Techniques identify how one data element relates to another data element in a different data source and identify the aggregation methods and operator methods on these data elements. The data sources associated with each of the data elements are mapped together, and the data elements are also mapped together to logically and dynamically construct the user query text, and pre-populate what the user might be searching for, as optimized for a given user context.

Example Environment

Figure 1:
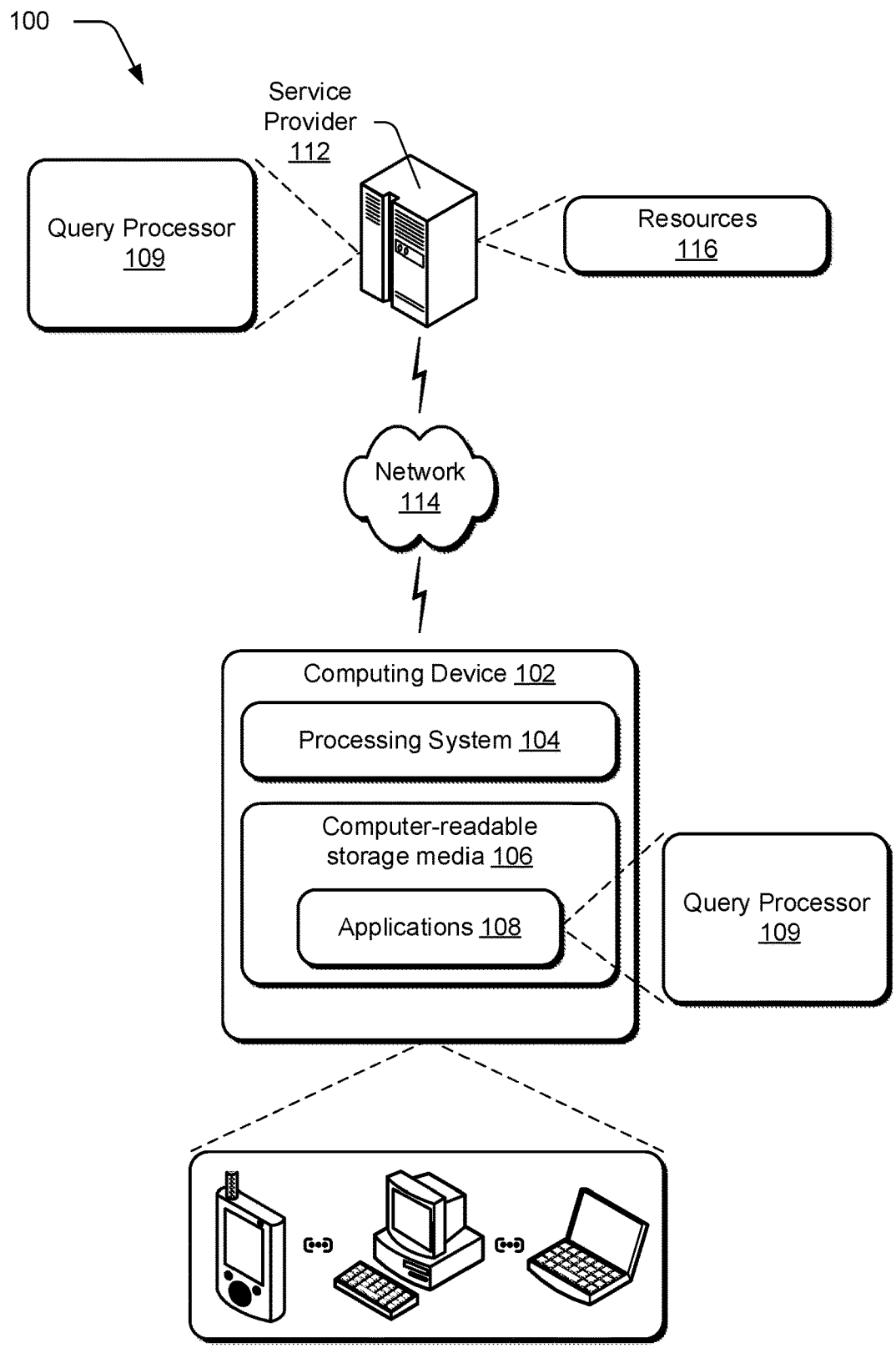
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein. In at least some implementations, applications 108 include or otherwise make use of a query processor 109. In some implementations, the query processor 109 is a standalone application that allows users to enter queries and have results returned from a wide variety of data sources. In other implementations, the query processor 109 is included as part of another application or system software such as a computing device's operating system. As will become apparent, aspects of the query processor 109 can be distributed across multiple computing devices. For example, aspects of the query processor 109 can be implemented by a service provider 112 and other aspects of the query processor 109 can be implemented by computing device 102.

The query processor 109, whether implemented on one computing device or multiple computing devices in a distributed fashion, is designed to provide improved crawling and curation of data and metadata from diverse data sources. In some embodiments, improvements are achieved by interpreting the context, vocabulary and relationships of data elements, to enable relational data search capability for users. The user querying process is improved by systematic identification of the aggregation methods and operators on the data elements as identified in the curation process. User query suggestions and recommendations can be adjusted based on the context, relationships between the data elements, user profile, and the data sources. When the user query is executed, the query text is translated into an equivalent of one or more search statements, such as SQL or PostGre statements, and the search is performed on the identified data sources. Results are assembled to present the meaningful visualization for the user query.

Applications 108 may also include a web browser which is operable to access various kinds of web-based resources (e.g., content and services). The web browser may include query processing functionality, such as that described in connection with the query processor 109, as a native part of the web browser or, alternately, as a plug-in to the web browser.

In at least some implementations, the applications 108 represent a client-side component having integrated functionality operable to access web-based resources (e.g., a network-enabled application), browse the Internet, conduct searches, interact with online providers, and so forth. Applications 108 further include an operating system for the computing device 102 and other device applications.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The environment 100 further depicts one or more service providers 112, configured to communicate with computing device 102 over a network 114, such as the Internet, to provide a "cloud-based" computing environment. Generally speaking, a service provider 112 is configured to make various resources 116 available over the network 114 to clients. The service providers 112 can provide query processing services, such as those provided by query processor 109, described above and below.

In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a notification service (such as one that sends various types of notifications to applications 108 and query processor 109), a content publisher service that distributes content, such as streaming videos and the like, to various computing devices, a web development and management service, a collaboration service, a social networking service, a messaging service, and so forth. Content may include various combinations of assets, video comprising part of an asset, advertisements, audio, query results, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example environment, consider now a discussion of some example details of a query processor 109 in accordance with one or more implementations.

Example Query Processor

Figure 2:
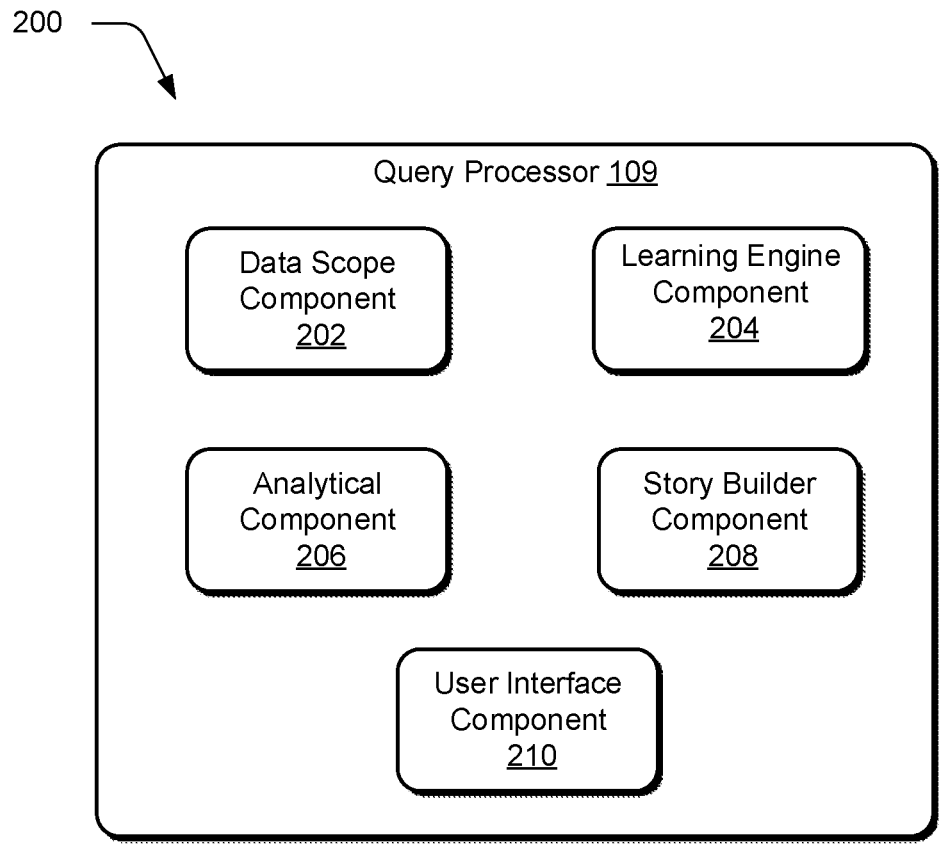
FIG. 2 is an illustration of an example query processor in accordance with one or more embodiments.
Figure 2:
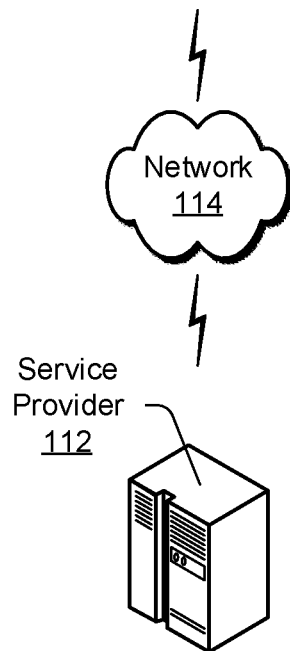

FIG. 2 illustrates an environment 200 that includes an example query processor 109. In this implementation, the query processor 109 includes, among other components, a data scope component 202, a learning engine component 204, an analytical component 206, a story builder component 208, and a user interface component 210. It is to be appreciated and understood, however, that aspects of the functionality of the query processor 109 can be implemented by a remote entity, such as one or more servers in a cloud-based environment. When implemented using a remote entity, in some implementations, one or more components of the query processor 109 can be present on the remote entity or can be present at both the computing device 102 and the remote entity. In addition, the components present at the computing device 102 can perform syncing operations with the components present at the remote entity.

The crawler component 202, curator component 204, compiler component 206, visualizer component 208, and user interface component 210 work together to allow a user to enter a query into search software, such as the query processor, have searches performed on multiple data sources, and have meaningful search results returned to the user.

Data scope component 202 is representative of functionality that processes metadata associated with a particular data source and organizes the metadata in a manner that expedites the crawling process during execution of the user search. The data can be sourced from a variety of data sources and each data source can have its metadata natively organized differently. The crawler component seeks to process the metadata and contextually structure the metadata in a manner that facilitates its use in the search functionality described herein. Data sources can include, by way of example and not limitation, internal data sources (e.g., internal to a particular computing device or internal network on which searching takes place), external data sources, public data sources and the like. These and other data sources can be relational data sources, non-relational data sources, cloud-based data sources, open data sources, and the like. Individual data sources can be analyzed based on the data source's name, format, and other related information to provide a context for the information contained in the data source. For example, a data source by the name "RetailFacts" will be first broken into two words—"Retail" and "Facts", by parsing of dictionary words from both left-to-right and right-to-left. "Retail" is then understood as a domain. The known list of vocabulary words will include words like stores, sales, salesrep, salesperson, sku and other items. Another example name of a data source is "OncologyPatients", which would be understood as "Oncology" and "Patients" and tied to life sciences terminology.

The name of variables can also matter and be taken into consideration. For example, if a table name is "Student_Fact" and if the system sees an attribute or a database column as "Age"—the system would assign a probability that the attribute represents student's age.

In one or more embodiments, the data in a particular data source can be grouped into logical sets of related entities. These entities may be related in a structural way. For example, the logical sets of related entities may reside in the form of tables having columns and rows. As an example, consider the following.

Assume that the data source of interest includes data that pertains to the Summer Olympics medal tally. This data can be compiled into a spreadsheet file and uploaded for processing by the data scope component 202. The sets or columns can be analyzed and assigned an attribute that defines the data's characteristics. So, for example, the medal tally data may consist of details about the athletes and the sports they play, their country of origin, the year in which they won the medal, the type of medal won, and the like. Each data column is associated with an attribute such as a person's name, country names, sports names, year, and number of medals. Once these attributes are defined and assigned to the data from the data source, the attributes are further analyzed in relation to the attributes of other entities or columns present in the data to identify logical relationships between them. Any suitable type of analysis can take place including formula-based analysis, mathematical deviation analysis, and the like. For example, the total number of medals won can be determined by the sum of columns containing the number of gold, silver, and bronze medals. In addition, the attributes of adjacent columns or groups of two or more columns can also be analyzed to enhance the meaning of the relationship between the columns. Adjacent columns would result in higher probability by the ranking algorithm. For example, if one column name is "ticket number" and the next column is "price", it would be ranked in the system as a likely "ticket price". The probability would keep increasing as the users start searching and accept the results. If other columns are titled as "from" and "to"—they would be understood as "travel origin" and "travel destination", and the domain would pick other words from travel industry.

Further, for example, if the attribute of one column is "person name" and the next column is a number between 1-100, the relationship between the columns may be determined as an age of the person, or the ID of the person. But if the adjacent column is "street", the prior column will also be marked as a likely "street number". This way, there are multiple probabilities for a single attribute during the scanning process and the probabilities will get automatically adjusted during the actual usage of the product, e.g., by being adjusted up or down based on the user's searches and acceptance of the results. Additional meaning is derived from the data that supports instant discovery by the data scope component.

In addition, the "randomness" of data can be analyzed to determine whether the data is a finite set or a non-finite set. Randomness can be considered as anything that does not contain repetitive data. For example, the names of countries is a finite set because there are only a limited number of countries. Such data is identified for use in presenting relevant visualizations, and also to show type-ahead suggestions in the search drop down menu, or related searches for a given user query. Examples of non-finite sets include, by way of example and not limitation, units sold month on month which can be very different each month, or monthly revenues—which are not going to be exactly same every month. Consider the case of an Oncology scenario, where the list of symptoms are finite. If the user queries "yearly trend of cancer symptoms"—one of the visualizations will be pie-chart of patient count for each symptom for every year, and the other visualization could be a grouped-bar chart for each symptom by year. If the user queried the same thing on a random attribute, e.g., "yearly trend of cancer patient ages"—the visualization can be a line chart, or a scatter plot.

Learning engine component 204 is representative of functionality that processes the metadata processed by the data scope component 202 and enriches the metadata by building context and semantics to better interpret a user's query. In the illustrated and described embodiment, the data elements are mapped to each other to identify relationships and set a context. This helps to narrow down the search results to an accurate and limited set. For example, is an employee entity is linked to a location entity, the scope of a user query on employees could be limited the linking entity. The scope of any query can generally be limited by the finite attributes in the same entity or the linked entities.

As another example, if the user enters a query for a list of all employees in a company, the results can be limited to a particular company location or office, thus mapping the two data elements—employees and office location—and establishing their relationship for better presentation to the user. The query can be typed by the user using natural language. The natural language query is analyzed and sentence constructions are examined for ascertaining the context of the query, as described below in more detail. For example, by identifying the address as an entity where an employee works, the search query "employees in office-address", or "employees at office-address" can be interpreted. As another example, consider an example query of "number of automatic transmission cars". Here, the system could show a type-ahead suggestion of "by model", or limit the search to show the results for a given model.

In one or more embodiments, the query typed by the user is checked for usage of abbreviations or commonly used in formal words and auto-corrections are performed. For example, if the user has typed "Rx", such is identified and replaced with the formal term "prescription" to search in the various data sources. Usually, such terms are identified by crawling multiple data sources, such as Wikipedia, and the ones appropriate for the data source are cached. In addition to displaying search results for the user's query, related searches that could be helpful for the user are also identified and presented. Related searches refer to the searches pertaining either the same subject, or matches some of the criteria that the user is querying for.

So-called adjacencies can be pre-generated based on the metadata. For example, while searching for doctors prescribing a certain medicine in a city, the results can also show the number of such doctors in the city's state and the number of doctors who are individual practitioners. Such additional information on similarities and anomalies is also identified from publicly available information sources and presented as a special note with the search results. For example, when a user searches for the average store sales, the special note can display "23% higher than national retail store average". This way, by curating the metadata, the user's search experience can be enriched.

Analytical component 206 is representative of functionality that the compiles the query results for the user. The data scope component 202 aggregates and identifies correlated data that has a parent-child relationship. Parent child relationship can generally refer to one-to-many relationship. Examples include "Employer and employees", or "school and students", or "city and residents", to name just a few.

Along with search results, this related data is also presented to the user. For example, if the user searches for auto sales for a particular region, the sales figures for the adjacent regions or the state in which the region falls can also be shown. The context of the query is also identified. For example, if the user has typed "100M", and there are words such as "revenue" or "sales" in the query, the query is interpreted as "100 million" and results are shown accordingly.

In one or more embodiments, any anomalies in the data are also identified and highlighted for the user. Further actions or recommendations for the identified anomaly can be presented to the user. That is, for a given set of query and results, anomalies can be detected. For example, a territory manager of several tire service centers may search for "centers with over 6 hours of service times". The results can be shown along with related searches such as, by way of example not limitation, information pertaining to the service center with longest service times and shortest times, and their customer feedback ratings can be shown. Further, a recommendation can be provided with a link to set up a review meeting with a particular service center's manager, and a list to download details of all the work orders. This way, the user can take quick actions to address the anomalies. Users are also provided an ability to search or filter cloud services or associated data sources by referencing previously occurred anomalies. For example, a query of "new home loans across Canada last month" by the head of mortgage business at a bank, can show the asked results along with the results of "top 5 cities with most outstanding home loans last month", and "top 3 age groups of home loaners last month". Further, a user can search for "show 5 actions before and after the security anomalies in the last 30 days" or "show all anomalies for a particular user".

Story builder component 208 is representative of functionality that presents query results to user by way of user interface component 210. The story builder component performs a number of different functions. For example, the story builder component attempts to understand the user's behavior to predict what the user will type in a search box. By doing so, the story builder component can provide predictions that are selectable by the user with respect to the natural language query the user enters. Alternately or additionally, the story builder component can attempt to resolve any ambiguities in a user's search query. For example, the user may enter "what were the number of DUIs in Washington last month" in the search box provided by the user interface component. The story builder component can provide other possible search options, and a drop-down menu, such as "what where the number of DUIs in Washington state last month" and "what were the number of DUIs in Washington DC last month." This allows the user to disambiguate the otherwise ambiguous search query. In addition, the story builder component also provides a mechanism for presenting query results to the user. In some instances, the story builder component includes a large library of presentation structures, such as chart types and the like, that can be used for presenting query results to the user. The story builder component can, over time, learn a particular user's preference and use the user's preference in selecting presentation structures for the user's data. Presentation structures that are surfaced to the user can be selected by the story builder component based on the type of data being searched. That is, in some instances tabular type presentation structures may be more appropriate than bar graphs, pie charts, and the like.

User interface component 210 is representative of functionality that enables a user to interface with the query processor 109. The user interface component does so by providing a search box in which the user may enter a natural language search query, as well as other visualizations such as those mentioned above, to enhance the user's experience.

In this manner, the query processor 109 can provide for improved crawling and curation of data and metadata from diverse data sources. Improvements can be achieved by interpreting the context, vocabulary and relationships of data elements, to enable relational data search capability for users. The user querying process is improved by systematic identification of the aggregation methods and operators on the data elements as identified in the curation process. For example, if an attribute is identified as a MONEY type, a user's query such as "stores with sales over 2M" will be understood as "stores with sales over 2000000". Similarly, if an attribute is identified as "age" in a student entity, a query "teenager students" will be interpreted as "students with age between 13 to 19". User query suggestions and recommendations can be adjusted based on the context, relationships between the data elements, user profile, and the data sources. When the user query is executed, the query text is translated into an equivalent of one or more search statements, such as SQL statements or other statements, and the search is performed on the identified data sources. Results are assembled to present a meaningful answer to the user query.

The environment 200 also includes network 114 and service provider 112 described above in detail. As noted above, aspects of the query processor 109 can be implemented by one or more service providers.

Having considered an example query processor 109 and its components, consider now example methods in accordance with one or more embodiments.

Example Methods

Figure 3:
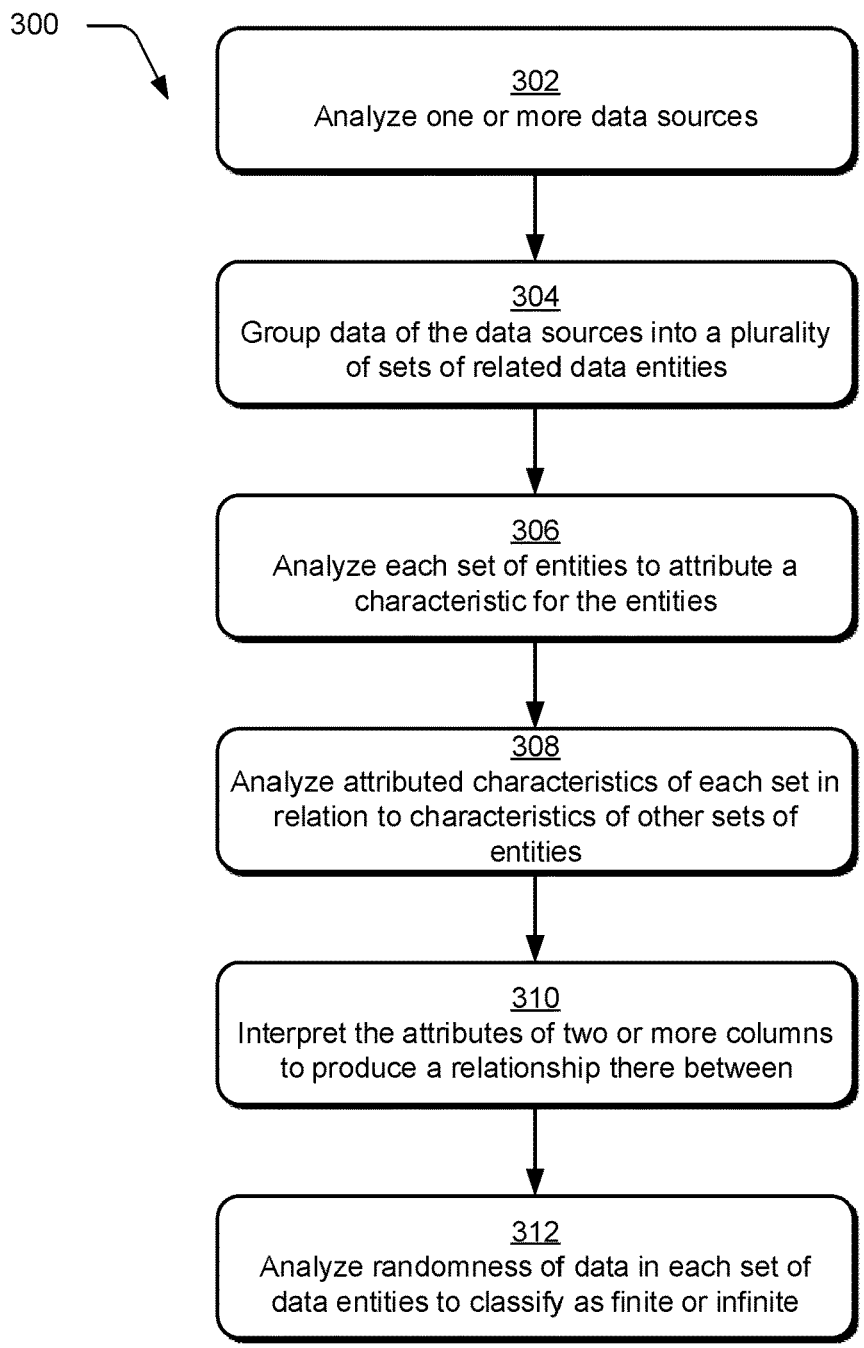
FIG. 3 is a flow diagram depicting an example procedure in accordance with one or more implementations.

FIG. 3 describes an example procedure 300 for processing metadata in a manner that expedites the crawling process. The method is designed to identify relationships and other attributes of metadata to facilitate search queries. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of a query processor 109, such as that described above.

One or more data sources are analyzed, at block 302, in order to provide a context for the information contained in the data source. Any suitable type of data source can be analyzed including, by way of example and not limitation, relational data sources or data warehouses, external data sources, public data sources and the like. The data source can be analyzed based on its name, sub-names, format, frequency of use, and access restrictions. At block 304, the data of the data source or sources is grouped into sets of related data entities. Any suitable type of related data entities can be used. In at least some embodiments, the data entities comprise columns. At block 306, each set of data entities is analyzed to attribute a characteristic to the data entity. Characteristics can include any suitable type of characteristics such as, by way of example and not limitation, people names, country names, street addresses, stock symbols, years, and any other suitable type of descriptive characteristic which might be associated with the data of a particular entity. At block 308, the attributed characteristics of each set of entities is analyzed in relation to characteristics of other sets of entities. This enables logical relationships to be identified between sets of data entities. For example, a column's data could be determined by the sum of two or more other columns. In the example given above, a column associated with the total medal tally is found to be the sum of the columns associated with gold, silver, and bronze medals.

At block 310, the attributes of two or more columns are interpreted to produce a relationship between the columns. For example, if one column is associated with a person's name, and the next column is age, the relationship between the columns is determined as the age of a person. At block 312, the randomness of data in each set of data entities, e.g., each column, is analyzed to classify the data as finite or infinite. If the data is determined to be a finite set, the data is cached and used for grouping features in visualizations. The above-described process enables a natural language search to be conducted using the sets of data entities.

Figure 4:
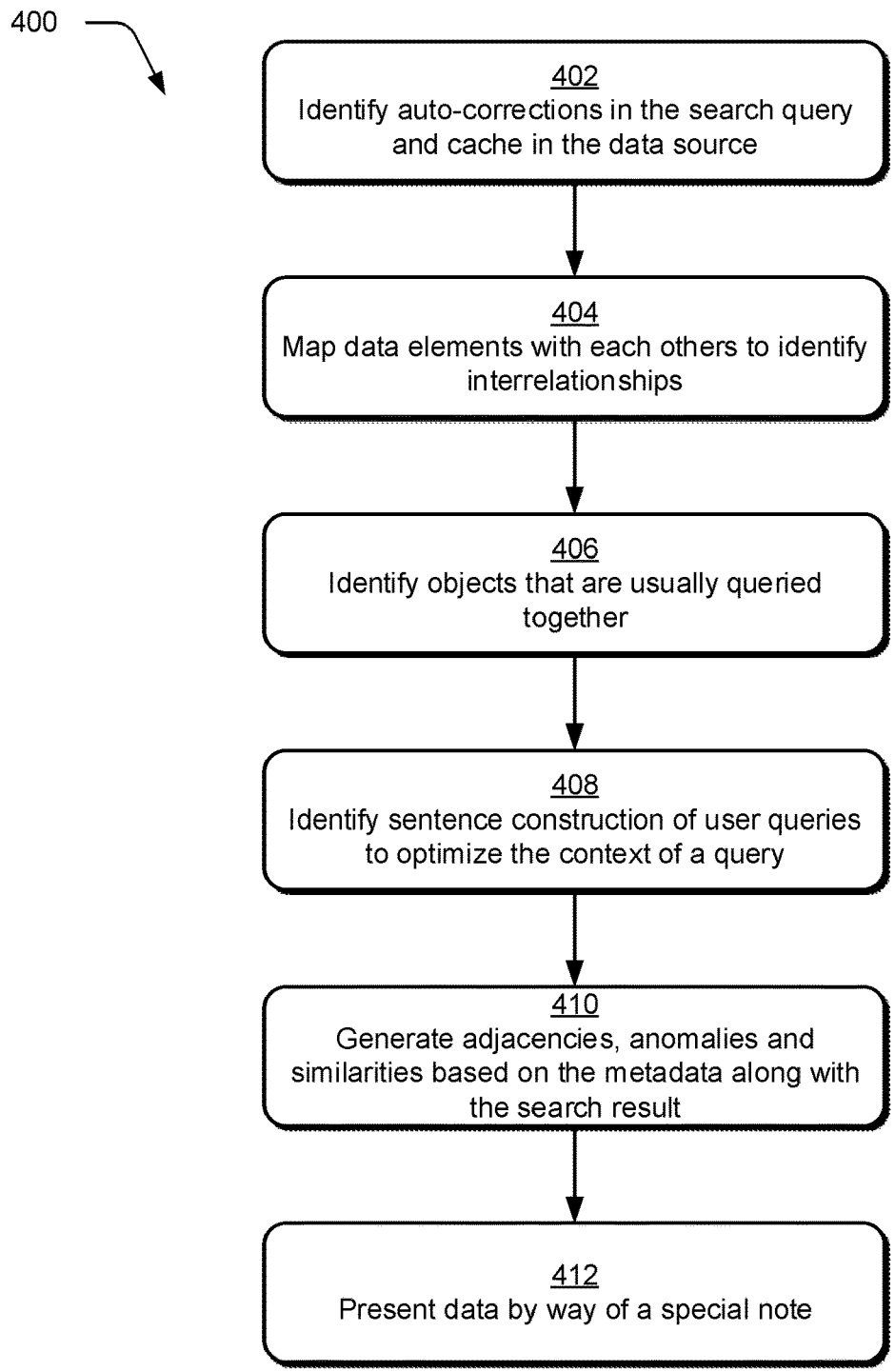
FIG. 4 is a flow diagram depicting an example procedure in accordance with one or more implementations.

FIG. 4 describes an example procedure 400 for curating metadata in a manner that expedites query processing. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of a query processor 109, such as that described above.

At block 402, auto corrections in the search query are identified. Examples of how this can be done are provided above. Auto corrections can be identified based on abbreviations, commonly used in formal terms, and metadata-based corrections that are found by the crawlers when processing a data source. At block 404, data elements are mapped with each other to identify interrelationships between the data elements. Examples of how this can be done are provided above. Doing so can help limit the search results to an accurate set of search results. At block 406, objects that are usually queried together are identified. Identifying objects that are usually queried together can help to enrich the query results. This also helps in constructing type-ahead suggestions for the user's convenience. For example, if the user is searching "stores" by "sales" and "volume of products" much more than by "locations", or "square foot area"—suggestions would be relevant to the user's search patterns and the objects that are normally searched together At block 408, sentence construction of user queries is identified to optimize the context of a query. For example, as a user starts typing "stores", the type-ahead suggestions can be constructed as "stores in Minneapolis", or "stores in Austin" etc. because the attribute containing the store location is identified as a city, and the logical construction would be with the word "in <city>".

At block 410, adjacencies, anomalies, and similarities based on the metadata are generated, along with the search result of the particular query. Examples of how this case be done are provided above. At block 412, data is presented by way of a special note. Examples of how this case be done are provided above.

Figure 5:
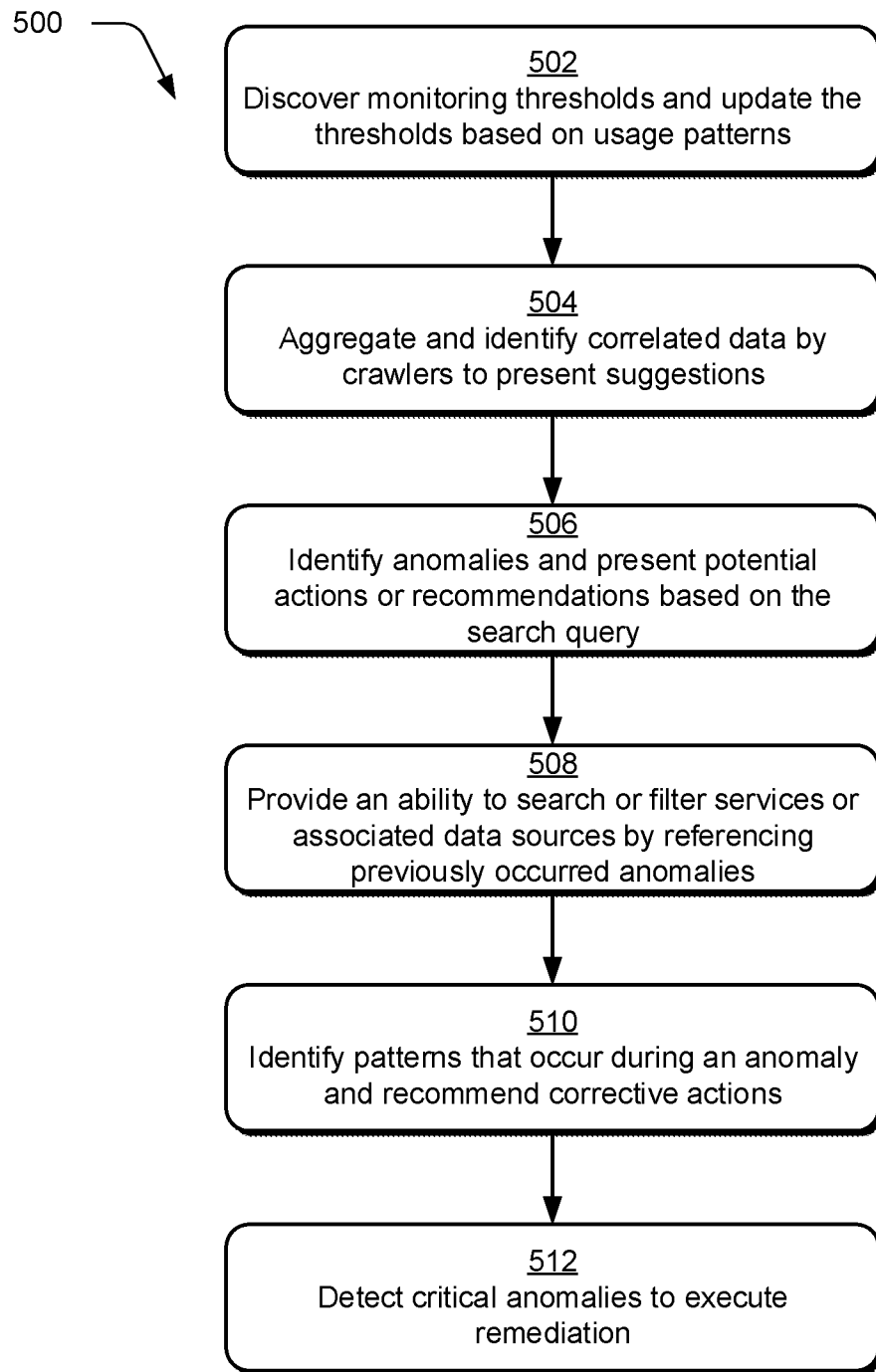
FIG. 5 is a flow diagram depicting an example procedure in accordance with one or more implementations.

FIG. 5 describes an example procedure 500 for compiling and presenting queried data. The method can monitor the query data to provide recommendations, identify anomalies, and support actionable remediations. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of a query processor 109, such as that described above.

At block 502, monitoring thresholds are discovered and updated based on usage patterns. At block 504, correlated data is aggregated and identified by one or more crawlers to present suggestions. At block 506, anomalies are identified and potential actions or recommendations are presented based on the user's search query. At block 506, an ability to search or filter services or associated data sources is provided by referencing previously occurred anomalies. At block 510, patterns that occur during an anomaly are identified and corrective actions are recommended. At block 512, critical anomalies are detected in order to execute remediation.

As examples of how this method can be implemented, consider the following four examples.

Example 1

Consider a scenario in which data is scanned for two attributes "sales" and "date." When the numbers are scanned, it is discovered that the sales had a yearly increasing pattern between 2000-2014, but a monthly decreasing pattern between 2014-2016. When the user types a query phrase "sales" the system can show suggestions adjacent the search box as "sales negative growth after 2014", "sales growth change from 2012", "sales monthly growth from 2014", and the like. The learning from the data scope module can be used to recommend the type-ahead suggestions, or to show the "related queries" after a user search. Another use of the learning from the data scope is to show filters such as "positive growth between 2000-2014" or "negative growth after 2014", thus showing more descriptively rather than just showing the yearly numbers. This is applicable for the additional examples below.

Example 2

Consider the scenario when a scan is conducted for "sales", "city", and "country". Here, the system identifies the stores in a particular geography (e.g., Northeast America) having higher than average sales, and the other geographies with average sales. When the user types "sales" in the search box, the system can show suggestions as "sales in the Northeast", "sales in the rest of the US", "sales in the rest of the world", and the like.

Example 3

Consider a scenario in which a scan is conducted for "employee", "claim category", and "expense reimbursement amount" in a travel and expense reimbursement scenario. Here, the system identifies the average claim for hotel reimbursement was $120 per day, the highest as $920 per day, and the lowest as $35 per day. When the user types "Hotel claims", the system can show suggestions as "Hotel claims higher than the average $120", "Hotel claims between $35 to the average amount of $120", or "Hotel claims over $520."

Example 4

Consider a scenario where a scan is conducted for "airline", "ticket route", and "fare." Here, the system identifies the fair as the highest for a particular route among all airlines, and identifies the highest pairs for each airline. When the user types "expensive" the system can show suggestions as "expensive routes among all airlines", "expensive top 10 fairs in Delta Airlines", "expensive top five airline wise routes."

Having considered the various embodiments described above, consider now an example system and device that can implement the embodiments. It is to be appreciated and understood, however, that the inventive principles can be implemented in other ways, without departing from the spirit and scope of the claimed subject matter.

Example System and Device

Figure 6:
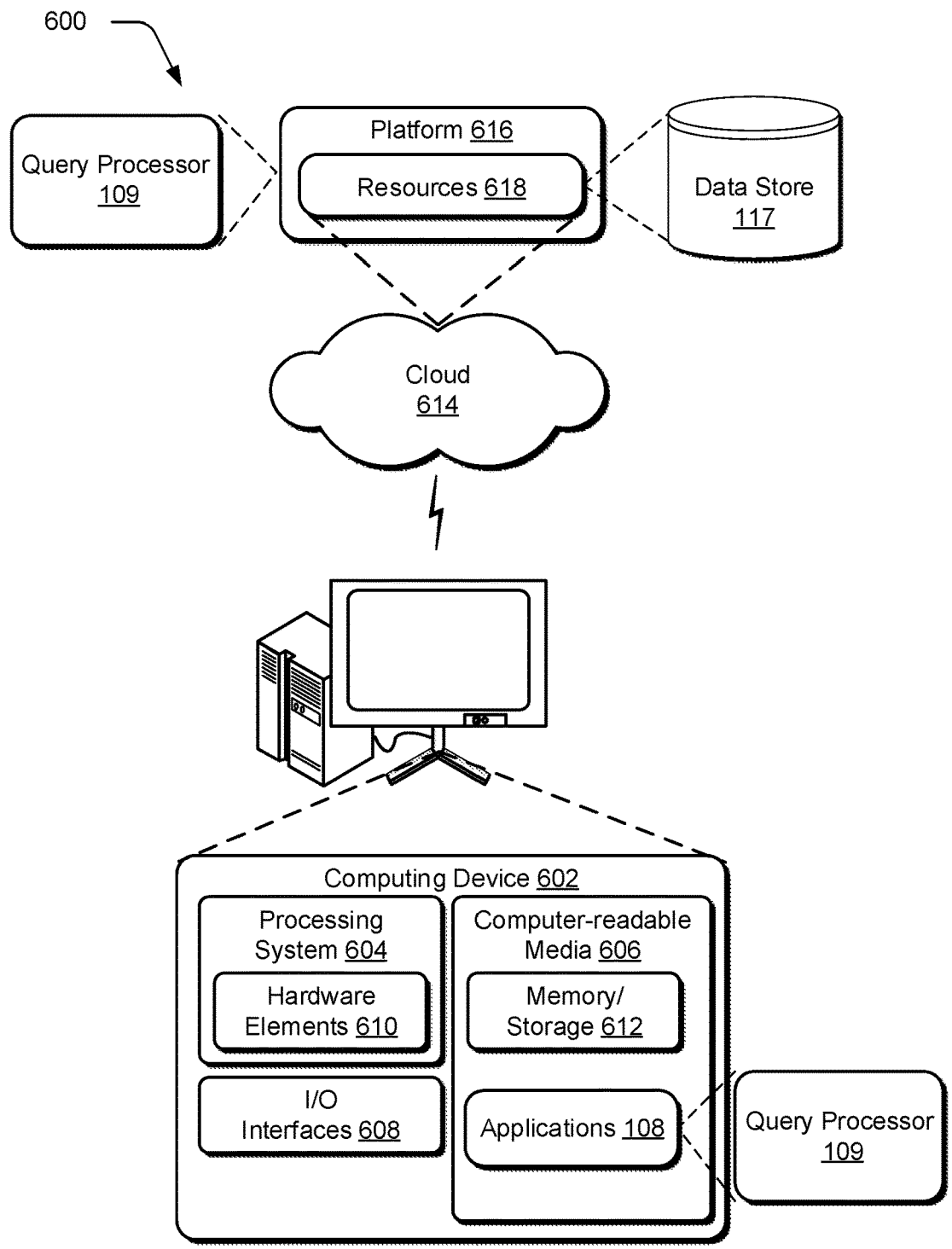
FIG. 6 illustrates an example system including various components of an example device that can be employed for one or more search implementations described herein.

FIG. 6 illustrates an example system generally at 600 that includes an example computing device 602 that is representative of one or more computing systems and/or devices that may implement the various techniques described herein. This is illustrated through inclusion of the applications 108 and, in particular, query processor 109, which operates as described above. The computing device 602 may be, for example, a server of a service provider, a device associated with a client (e.g., a client device), an on-chip system, and/or any other suitable computing device or computing system.

The example computing device 602 is illustrated as including a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, holographic devices and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Such applications can include one or more aspects of query processor 109 as described above. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device implementation, implementation of functionality described herein may be distributed throughout the system 600. For example, the functionality may be implemented in part on the computing device 602 as well as via the platform 616 that abstracts the functionality of the cloud 614.

CONCLUSION

Improved crawling and curation of data and metadata from diverse data sources is described. In some embodiments, improvements are achieved by interpreting the context, vocabulary and relationships of data element, to enable relational data search capability for users. The user querying process is improved by systematic identification of the data objects, context, and relationships across data objects and elements, aggregation methods and operators on the data objects and data elements as identified in the curation process. User query suggestions and recommendations can be adjusted based on the context, relationships between the data elements, user profile, and the data sources. When the user query is executed, the query text is translated into an equivalent of one or more query statements, such as SQL or PostGre statements, and the query is performed on the identified data sources. Results are assembled to present the answer in a meaningful visualization for the user query.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method, comprising:
    identifying a set of related data entities in a data source, each data entity including multiple data values;
    generating, based on a number of repeated values included in a distribution of data values included in the set of related data entities, a classification of the set of related data entries as finite or non-finite;
    receiving a request for presenting the data values included in the set of related data entities; and
    generating a response to the request based on the classification.

2. The computer-implemented method of claim 1, wherein the classification for the set of related data entities is based on whether the distribution of values is random.

3. The computer-implemented method of claim 1, wherein generating the response comprises selecting, based on the classification, a presentation format for a result of the request.

4. The computer-implemented method of claim 3, wherein the presentation format includes one of:
    a first visualization type associated with finite sets; or
    a second visualization type associated with non-finite sets.

5. The computer-implemented method of claim 1, wherein:
    the request comprises an incomplete request, and
    generating the response comprises generating, based on the classification, one or more completion suggestions associated with the incomplete request.

6. The computer-implemented method of claim 1, wherein:
    the request comprises a search request, and
    generating the response comprises generating, based on the classification, one or more related search requests.

7. One or more non-transitory computer readable media storing instructions that, when executed by one or more processors, cause the one or more processors to perform the steps of:
    identifying a set of related data entities in a data source, each data entity including multiple data values;
    generating, based on a number of repeated values included in a distribution of data values included in the set of related data entities, a classification of the set of related data entries as finite or non-finite;
    receiving a request for presenting the data values included in the set of related data entities; and
    generating a response to the request based on the classification.

8. The one or more non-transitory computer readable media of claim 7, wherein the classification for the set of related data entities is based on whether the distribution of values is random.

9. The one or more non-transitory computer readable media of claim 7, wherein generating the response comprises selecting, based on the classification, a presentation format for a result of the request.

10. The one or more non-transitory computer readable media of claim 9, wherein the presentation format includes one of:
    a first visualization type associated with finite sets; or
    a second visualization type associated with non-finite sets.

11. The one or more non-transitory computer readable media of claim 7, wherein:
    the request comprises an incomplete request, and
    generating the response comprises generating, based on the classification, one or more completion suggestions associated with the incomplete request.

12. The one or more non-transitory computer readable media of claim 7, wherein:
    the request comprises a search request, and
    generating the response comprises generating, based on the classification, one or more related search requests.

13. A system, comprising:
    a memory storing instructions, and
    one or more processors for executing the instructions to:
        identify a set of related data entities in a data source, each data entity including multiple data values;
        generate, based on a number of repeated values included in a distribution of data values included in the set of related data entities, a classification of the set of related data entries as finite or non-finite;
        receive a request for presenting the data values included in the set of related data entities; and
        generate a response to the request based on the classification.

14. The system of claim 13, wherein:
    the request comprises an incomplete request, and
    the one or more processors generate the response by generating, based on the classification, one or more completion suggestions associated with the incomplete request.

15. The system of claim 13, wherein:
    the request comprises a search request, and
    the one or more processors generate the response by generating, based on the classification, one or more related search requests.

16. The system of claim 13, wherein the one or more processors generate the response by selecting, based on the classification, a presentation format for a result of the request.

17. The system of claim 16, wherein the presentation format includes one of:
    a first visualization type associated with finite sets; or
    a second visualization type associated with non-finite sets.

* * * * *